United States Patent [19]

Suzuki

[11] Patent Number: 5,453,881
[45] Date of Patent: Sep. 26, 1995

[54] OBJECTIVE LENS HOLDING DEVICE

[75] Inventor: Hiroyuki Suzuki, Higashihiroshima, Japan

[73] Assignee: Sharp Kabushiki Kaisha, Japan

[21] Appl. No.: 913,070

[22] Filed: Jul. 14, 1992

[30] Foreign Application Priority Data

Jul. 22, 1991 [JP] Japan ................... 3-180901

[51] Int. Cl.6 ................... G02B 7/02; G11B 7/08
[52] U.S. Cl. ................... 359/824; 359/814; 369/44.14; 369/44.24
[58] Field of Search ................... 359/873, 874, 359/823, 824; 369/66.15–44.16, 44.21, 215

[56] References Cited

U.S. PATENT DOCUMENTS 5,243,584   9/1993   Kang ................... 369/44.16

FOREIGN PATENT DOCUMENTS

| 137237 | 4/1985 | European Pat. Off. . | |
|--------|--------|----------------------|---|
| 238224 | 9/1987 | European Pat. Off. . | |
| 53358  | 3/1989 | Japan ................... | 359/44.21 |
| 100742 | 4/1989 | Japan ................... | 369/44.21 |
| 78027  | 3/1990 | Japan . | |
| 66740  | 3/1990 | Japan . | |
| 158926 | 6/1990 | Japan ................... | 369/44.21 |
| 225633 | 10/1991 | Japan . | |

OTHER PUBLICATIONS

Patent Abstracts Of Japan, unexamined applications, P field, vol. 14, No. 230 May 16, 1990 The Patent Office Japanese Government p. 18 P 1048.

*Primary Examiner*—Paul M. Dzierzynski
*Assistant Examiner*—Thong Nguyen
*Attorney, Agent, or Firm*—Nixon & Vanderhye

[57] ABSTRACT

An objective lens holding device has a lens holder supporting an objective lens and a parallel link. The lens holder is installed in a housing through the parallel link. The parallel link is provided with hinges, made of synthetic resin, that can be elastically distorted so as to shift the lens holder in the focusing direction. A stopper in a protruding fashion is installed on the parallel link in order to prevent the lens holder from contact with the inner wall of the housing even if the hinges become softened to cause the lens holder to be dislocated under high temperature. Therefore, the arrangement prevents the lens holder from being distorted by the contact between the lens holder and the inner wall under high temperature. As a result, when the ambient temperature drops to normal temperature and thereby the hinges recover their original modulus of elasticity to allow the lens holder to move to the original position, the lens holder is allowed to return to its original position without having a deviation from its original state. Therefore, deterioration in optical performance due to changes of installation accuracy of the objective lens can be eliminated.

23 Claims, 11 Drawing Sheets

OBJECTIVE LENS HOLDING DEVICE

FIELD OF THE INVENTION

The present invention relates to an objective lens holding device for use in an optical pickup to be employed in optical information recording-reproduction apparatuses.

BACKGROUND OF THE INVENTION

An optical pickup focuses a light beam onto a recording surface of an optical disk through an objective lens. The objective lens is installed in an objective lens holding device. The holding device which is controlled according to a varying amount of a detected light beam reflected from the optical disk so that the focused light beam accurately traces each track on the recording face.

The objective lens is secured to a lens holder in the objective lens holding device. In this arrangement, the lens holder is driven in either of two directions: a focusing direction and a tracking direction. The focusing direction is identical to the light-axis direction of the light beam that is perpendicular to the recording surface of the optical disk, and the tracking direction is identical to the radial direction of the optical disk.

In such an objective lens holding device, it is necessary to drive the objective lens in the tracking direction and in the focusing direction without causing any deviation between the axis of the objective lens and the light axis so that each track of the recording surface is precisely traced.

For this reason, such devices have been known in the art and are characterized by a parallel link mechanism for moving the lens holder with the objective lens in the focusing direction and a pivot mechanism for moving the objective lens in the tracking direction. These mechanisms are installed so as to prevent any deviation between the axis of the objective lens and the light axis.

The parallel link mechanism includes a pair of plate-shaped links facing each other in the focusing direction. Each link is provided with hinges at both corners of the fixed edge and at both corners of the pivoting edge. A rocking vertical plate is secured to the plate-shaped links by means of the hinges secured to both corners of the pivoting edge These parallel link mechanism and pivot mechanism are integrally molded from synthetic resin to make a mold-type support member for the purpose of improving working efficiency of assembly and achieving low cost.

Each of the focusing-use hinges in the parallel link mechanism has elasticity since it is provided with a partially thinner portion in the focusing direction. On the other hand, the pivot mechanism includes tracking-use hinges each of which has elasticity with a partially thinner portion and also has a pivotal axis that is parallel to the focusing direction. Thus, the lens holder is supported at a predetermined position with each of the focusing-use hinges being elastically deformed.

In order to drive the lens holder in such a manner, a focusing-use coil and a tracking-use coil are installed in the lens holder, and a magnetic circuit for producing magnetic fields that permit those coils to generate driving forces is installed in the optical pickup.

When the objective lens is attached to the lens holder, the adjustment of the optical pickup is performed so that the objective lens is located at an optimum position with respect to the axis of the light beam, for example, by aligning the light axis with the axis of the objective lens.

For the optical pickup thus adjusted as described above, it is desirable that the axis of the objective lens should not deviate from the light axis, that is, should not be tilted therefrom, under any changes of environmental conditions from high temperature to low temperature or from low temperature to high temperature.

The objective lens holding devices adopting the above-mentioned mold-type support member have many advantages such as high working efficiency of assembly and low cost. However, they also have a disadvantage in that the axis of the objective lens tends to deviate from the light axis due to temperature changes.

For example, in the case of conducting shelf tests under high temperatures, since the focusing-use hinges are made of thin resin, they will softened and cause the optical pickup to deteriorate in performance as is described below.

More specifically, when an optical pickup, whose objective lens has been adjusted so as to be located at an appropriate position with respect to the light axis, is left under high temperature, the focusing-use hinges will softened and cause the lens holder including those coils and objective lens to dislocate due to its weight. If this state is left untreated, the bottom surface of the lens holder will contact the inner wall of a housing.

In such case, the inner wall has been formed without taking account of the light axis although the objective lens has been installed and adjusted with respect to the light axis. Therefore, when the lens holder contacts the inner wall, it is often kept in a slanted state not parallel to the original state, that is, in a distorted state.

If the ambient temperature drops to normal temperature or low temperature after the lens holder has been kept in the distorted state, the focusing-use hinges will recover their original modulus of elasticity and the lens holder is moved to its original state. However, the lens holder will actually return to a somewhat different state from the original state (i.e., before it underwent the high temperature).

Therefore, the main problem of the conventional arrangement is that deviation and tilt might occur between the axis of the objective lens and the light axis due to temperature changes, resulting in serious adverse effects on the optical performance.

Conventionally, in order to avoid the deterioration in optical performance due to temperature changes, it has been suggested to enhance the degree of parallelism between the inner walls of those parts, such as the base plate, located in the housing and the bottom surface of the lens holder. However, achieving such precision in machining necessitates highly precise machining and adjusting processes. But such precision jeopardizes the cost reduction which otherwise would be achieved by adopting the mold-type support member.

Another possible method for solving the above problem involves heating the whose device to a high temperature before the adjusting process for attaching the objective lens to the lens holder. Then the adjusting process is conducted. In this method, it is possible to adjust the positional relationship between the objective lens and the light axis so that serious deviation is not caused in the relationship even after the lens holder has come into contact with the base plate under high-temperature states occasioned thereafter. However, such an adjusting method causes problems in that time-consuming processes are required and the additional process for heating the whole process has to be provided, resulting in a high manufacturing cost.

Furthermore, conventionally, once the lens holder has been brought into a distorted state due to temperature changes to cause the deviation of the mounting station of the objective lens, the adjustment of the mounting station of the objective lens is again conducted.

SUMMARY OF THE INVENTION

It is an object of the present invention to provide an objective lens holding device which can prevent deterioration in optical performance caused by decreased installation accuracy of the objective lens due to temperature changes, by the use of a simple arrangement at low cost.

This and other objects are attained in the present invention which in a specific embodiment relates to an objective lens holding device basically having:

a housing;

objective lens means for converging light onto a predetermined position;

lens holding means for holding the objective lens means;

link means for coupling the lens holding means to the housing, the link means being provided with a hinge section which is elastically distorted such that the lens holding means shifts the objective lens in a focusing direction;

a pivotal system which is rotatively pivoted such that the lens holding means is driven in a tracking direction; and contact prevention means, formed in a protruding fashion, for preventing the lens holding means from contact with an inner wall of the housing, the contact being caused by an excessive dislocation of the hinge section due to temperature changes. The objective lens holding device is characterized in that the contact prevention means, which is integrally molded together with the link means, is installed in the vicinity of the center of gravity of a pivotal system in the tracking direction including the objective lens means and the lens holding means.

With the above-mentioned arrangement, even if the lens holding means is dislocated in the focusing direction due to the hinge section that has been softened under high temperature, the contact prevention means supports the lens holding means and prevents it from contacting the inner wall of the housing.

Therefore, the arrangement prevents the lens holding means from being distorted by the contact between the lens holding means and the housing under high temperature: When the ambient temperature drops from high to normal or low temperature and thereby the hinge section recover its original modulus of elasticity to allow the lens holding means to move to the original position, the lens holding means is allowed to return to its original position such that the objective lens means returns to its original position, that is, to its original state.

As a result, it is possible to eliminate the deviation of the objective lens which has been installed and adjusted in the lens holder so as to be located at a predetermined position; therefore, deterioration of the optical performance of the objective lens due to temperature changes can be avoided.

For a fuller understanding of the nature and advantages of the invention, reference should be made to the ensuing detailed description taken in conjunction with the accompanying drawings.

DESCRIPTION OF THE EMBODIMENT

Referring to FIGS. 1 through 5, the following description will discuss one embodiment of an objective lens holding device of the present invention.

Figure 5:
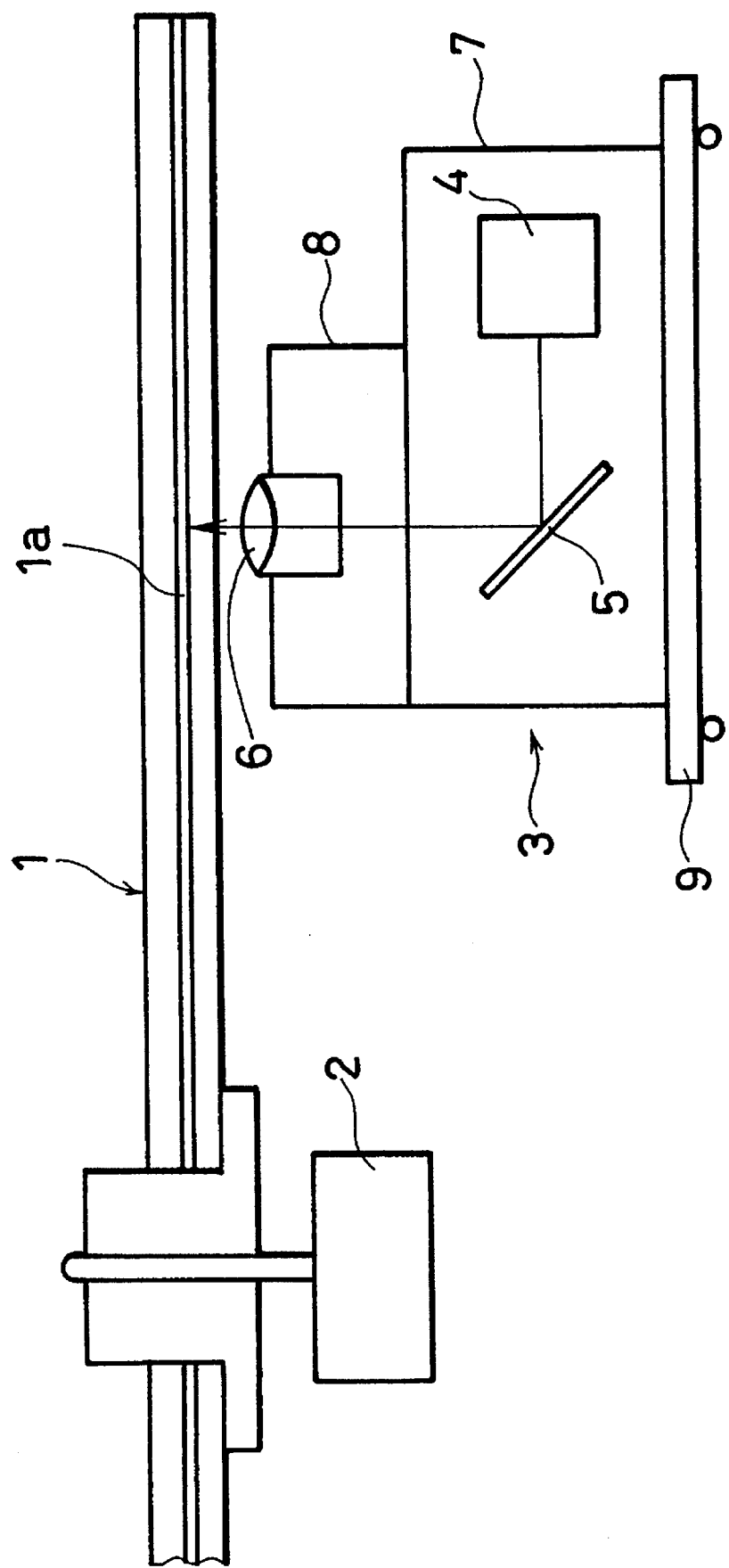
FIG. 5 is a schematic side view of one example of an optical information recording-reproduction apparatus provided with the objective lens holding device.

First, an explanation will be briefly given on an optical information recording-reproduction apparatus provided with the objective lens holding device by reference to FIG. 5. The optical information recording-reproduction apparatus has a motor 2 for rotatively driving an optical disk 1 and an optical pickup 3 for projecting a light beam onto a recording surface 1a of the optical disk 1 as well as for receiving light reflected from the optical disk 1.

The optical pickup 3 has a laser light source 4, a polarizing mirror 5 and an objective lens 6. The laser light source 4 generates the light beam; the polarizing mirror 5 reflects the light beam therefrom; and the objective lens 6 converges the light beam onto the recording surface 1a.

The laser light source 4 and the polarizing mirror 5 are installed in a case 7. The objective lens 6 is held by an objective lens holding device 8 which is disposed in the light beam path between the polarizing mirror 5 and the optical disk 1.

The optical pickup 3 is moved by a moving mechanism 9 having a driving means (not shown) such as a linear motor, in a radial direction of the optical disk 1 (that is parallel to the recording surface 1a and orthogonal to the light axis, that is, in a tracking direction).

Figure 1:
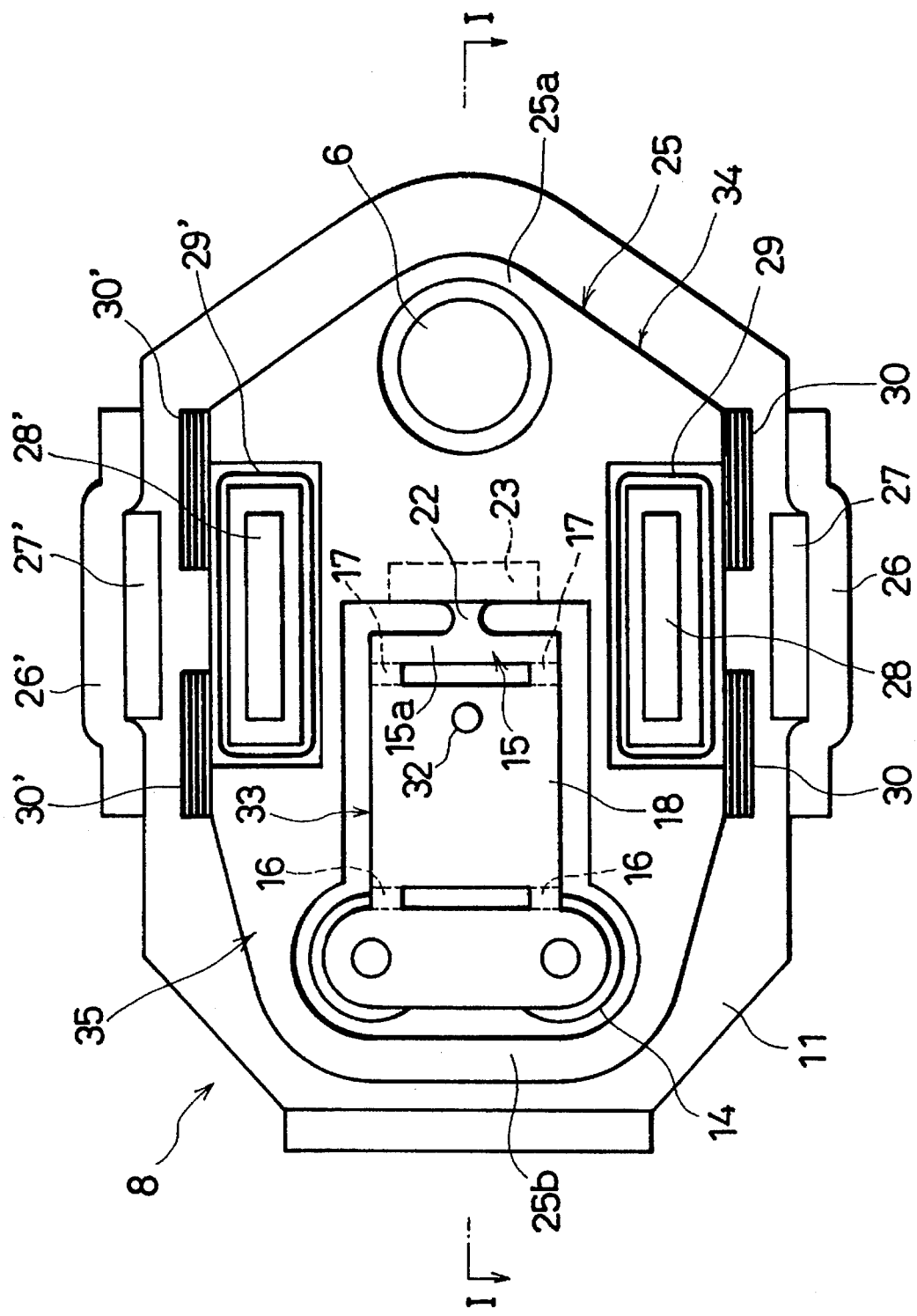
FIG. 1 is a plan view showing an objective lens holding device of the present invention with its cover removed.
Figure 2:
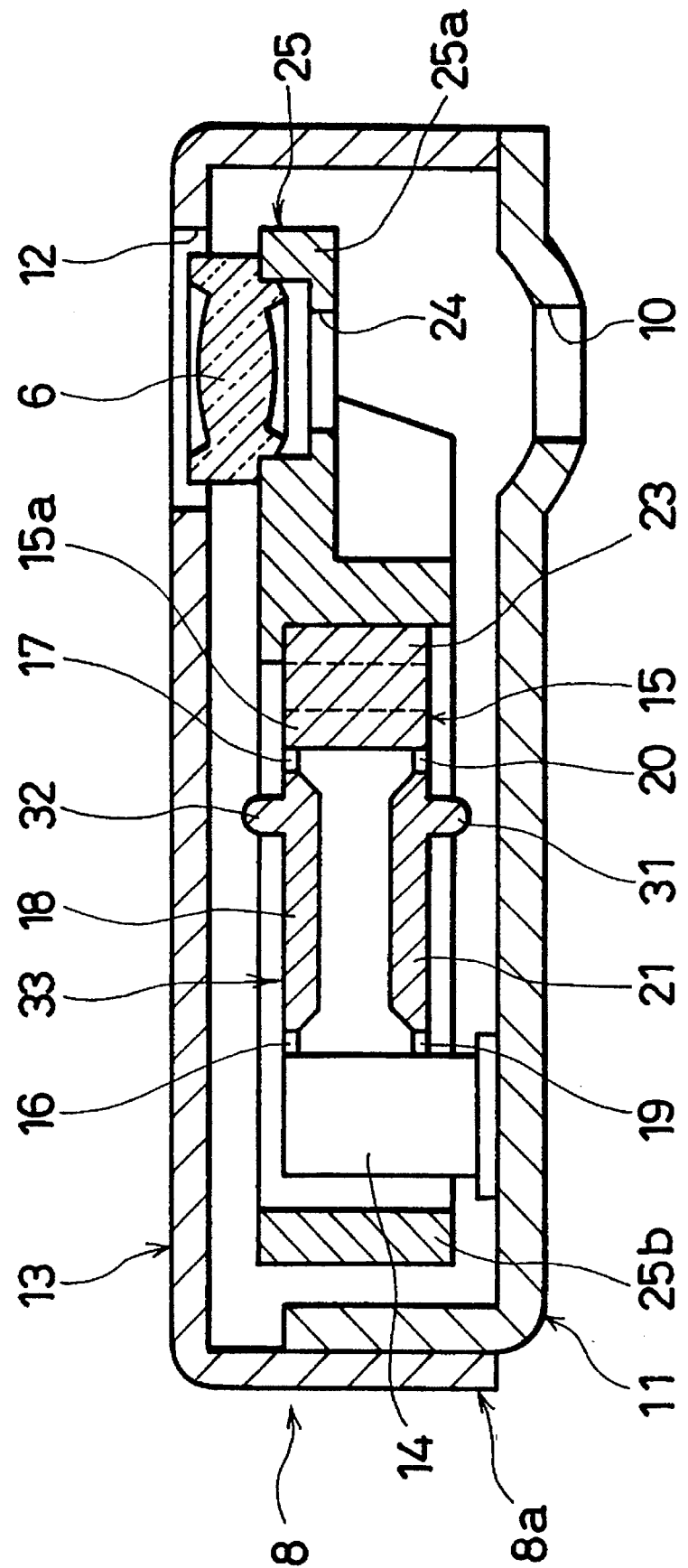
FIG. 2 is a cross-sectional view taken along the line I—I showing the objective lens holding device of FIG. 1 located at an initial position.

Next, referring to FIGS. 1 through 4, the following will describe the objective lens holding device 8. As shown in FIG. 2, a housing 8a of the objective lens holding device 8 has a base plate 11 and a cover 13 that is removably attached to the base plate 11.

The base plate 11 has a bent section that contacts the edge of the cover 13. Base plate 11 is also provided with an aperture 10, formed at one end, through which the light beam is directed. The cover 13 is a U-shaped box in its cross-section and is provided with an opening 12 that is located at a position opposite to the aperture 10 (when seen in the state where the cover 13 is attached to the base plate 11).

In the housing 8a, a support member 14 is vertically installed on the base plate 11 by means of screws or other members at an end opposite the aperture 10. The support member 14 supports the objective lens 6 through a parallel link mechanism 33, a rocking member 15 and a lens holder 25.

As shown in FIGS. 1 and 2, the parallel link mechanism 33 has a pair of rectangular-shaped link members 18 and 21 and a plurality of pairs of hinges 16, 17, 19 and 20, each of which is allowed to pivotably rock in the focusing direction.

One edge of the link member 18 in the lengthwise direction is secured to the upper end of the support member 14 at the corners thereof by means of the hinges 16, while one edge of the link member 21 in the lengthwise direction is secured to the lower end of the support member 14 at the corners thereof by means of the hinges 19.

The other edge of the link member 18, which is a pivoting edge, is secured (through the pair of hinges 17) to two corners of one edge of a rocking vertical plate 15a. The other edge of the link member 21 is secured to two corners of the other edge of the rectangular-shaped rocking vertical plate 15a through the pair of hinges 20. Link members 18 and 21 are kept parallel with each other, and the rocking vertical plate 15a is maintained virtually in parallel with the aforementioned light axis.

In this arrangement, the respective pairs of hinges 16, 17, 19 and 20 are located at the respective corners of two hypothetical parallelograms facing each other in the focusing direction; therefore, the parallel link mechanism 33 can shift the rocking vertical plate 15a in the focusing direction while maintaining its parallelism to the light axis.

The rocking member 15 is provided with a plate-shaped lens holder mounting member 23 that faces the rocking vertical plate 15a. Member 23 is parallel with member 15 with a predetermined space provided therebetween. Member 23 is also provided with a hinge 22 that rotatably connects the lens holder mounting member 23 to the rocking vertical plate 15a. The hinge 22 is installed so as to have its pivotal axis in parallel with the light axis.

Support member 14, the rocking member 15, hinges 16, 17, 19 and 20, and the parallel link mechanism 33 are integrally molded from thermoplastic synthetic resin to make a mold-type support member. The material of the mold-type support member is not necessarily limited to a specific material as long as the material chosen can function as an elastic spring member at room temperature. It is desirable to employ such materials because elasticity and durability are needed for the hinges 16, 17, 19, 20 and 22. Thus, each of the hinges 16, 17, 19 and 20 is provided with a partially thinner portion in the focusing direction so as to become elastic and pivotable in the focusing direction, while the hinge 22 is provided with a partially thinner portion in the tracking direction so as to become elastic and pivotable in the tracking direction.

The lens holder 25 has a semi-plate shape with a hollow portion therein. Lens holder 25 is attached to the lens holder mounting member 23 in a surrounding manner such that the support member 14, the parallel link mechanism 33 and the rocking vertical plate 15a are contained in the hollow portion with predetermined spaces.

Therefore, the lens holder 25, which has been attached to the lens holder mounting member 23, is supported at a predetermined position in a floating state by the hinges 16, 17, 19 and 20 that are elastically deformed.

Moreover, the lens holder 25 has a lens mounting section 25a that has a semi-plate shape and is extended outwardly. The lens mounting section 25a has a through hole 24 formed therein, which allows the light beam to pass therethrough. Objective lens 6 is mounted on the through hole 24 at the side facing the cover 13.

In this arrangement, those axes of the objective lens 6, the through hole 24, the aperture 10 of the base plate 11 and the opening 12 of the cover 13 are aligned to a virtually straight line such that the light beam projected from the laser light source 4 is allowed to pass through the housing 8a.

Further, in this order from outside inward, a pair of yokes 26 and 26', a pair of magnets 27 and 27' and a pair of yokes 28 and 28' are installed at respective pairs of positions in the respective sides of the base plate 11 that are symmetrical with respect to a hypothetical plane including the pivotal axis and the light axis, each pair having the same distance from the hypothetical plane. Thus, those components respectively form magnetic circuits.

On the other hand, a pair of bobbin-shaped focusing coils 29 and 29' are respectively installed at the two sides of the lens holder 25, and a pair of tracking coils 30,30 and a pair of tracking coils 30',30' are installed outside of the respective focusing coils 29 and 29'. Those pairs of coils are arranged to be respectively placed within the magnetic fields of the magnetic circuits.

In such an arrangement, when the focusing coils 29 and 29' are energized, a driving force is produced to drive the lens holder 25 of FIG. 1 in the focusing direction. Thus, in response to this electromagnetic force, the objective lens 6 is shifted in the focusing direction by the parallel link mechanism 33 while maintaining the parallelism between the axis of the objective lens 6 and the aforementioned light axis.

Focusing coils 29 and 29' are disposed at such stations that no angular moments are generated when the lens holder 25 is shifted in the focusing direction by the driving forces generated by the focusing coils 29 and 29'.

In other words, the center of gravity of a rocking system 35 including those members involved in the shifting movement in the focusing direction is situated within a hypothetical plane including vectors of the driving forces produced by the focusing coils 29 and 29', and respective points of application of the driving forces are maintained to have the same distance from the center of gravity. Thus, the generation of the angular moments with respect to the rocking system 35 can be avoided when the rocking system 35 is shifted by the driving forces. Here, the rocking system 35 is constituted by the objective lens 6, the lens holder 25, the rocking member 15 and parallel link mechanism 33.

On the other hand, when the two pairs of tracking coils 30 and 30' are energized, a rotative driving force is produced such that the lens holder 25 is rotated on the hinge 22 while maintaining its horizontal state, and the objective lens 6 is thus shifted in the tracking direction in response to the rotative driving force.

Tracking coils 30 and 30' are arranged so that the center of the angular moments of the rotative driving forces in the tracking direction that are produced by them is located on the pivotal axis. In addition, the center of gravity and the center of moments of inertia of a pivotal system 34 that is constituted by the objective lens 6, the lens holder 25 and the lens holder mounting member 23, are also arranged to be located on the above-mentioned pivotal axis. Thus, unwanted vibrations or other adverse effects that may occur in the pivotal movement of the pivotal system 34 can be reduced, thereby making it possible to smoothly control the pivotal system 34.

The lens holder 25 is adjusted in its balance so that the center of gravity of the rocking system 35, the center of gravity and the center of moments of inertia of the pivotal system 34 are located at a predetermined position. For this reason, a balancer section 25b is provided in the lens holder 25.

By adjusting the objective lens 6 in this manner, the optical pickup 3 is allowed to trace each of the tracks on the recording surface 1a of the optical disk 1.

In this arrangement, when used under high temperature or subjected to a shelf test under high temperature, the hinges 16, 17, 19 and 20 in the parallel link mechanism 33 lose their modulus of elasticity and soften to the extent that they fail to maintain the lens holder 25 at the predetermined station.

In the above-mentioned objective lens holding device 8 for use with the pickup 3 (that is placed below the recording surface 1a of the optical disk 1 that is rotated horizontally), a protruding stopper 31 is secured to the link member 21 in a protruding manner toward the inner wall of the base plate 11 in order to prevent the lens holder 25, subjected to the distortion, from contacting the inner wall of the base plate 11.

More specifically, the stopper 31 is placed at a position on the link member 21 that is opposite to the base plate 11 and closer to the rocking member 15 (e.g., in the vicinity of the center of gravity of the rocking system 35 and pivotal system 34).

Figure 3:
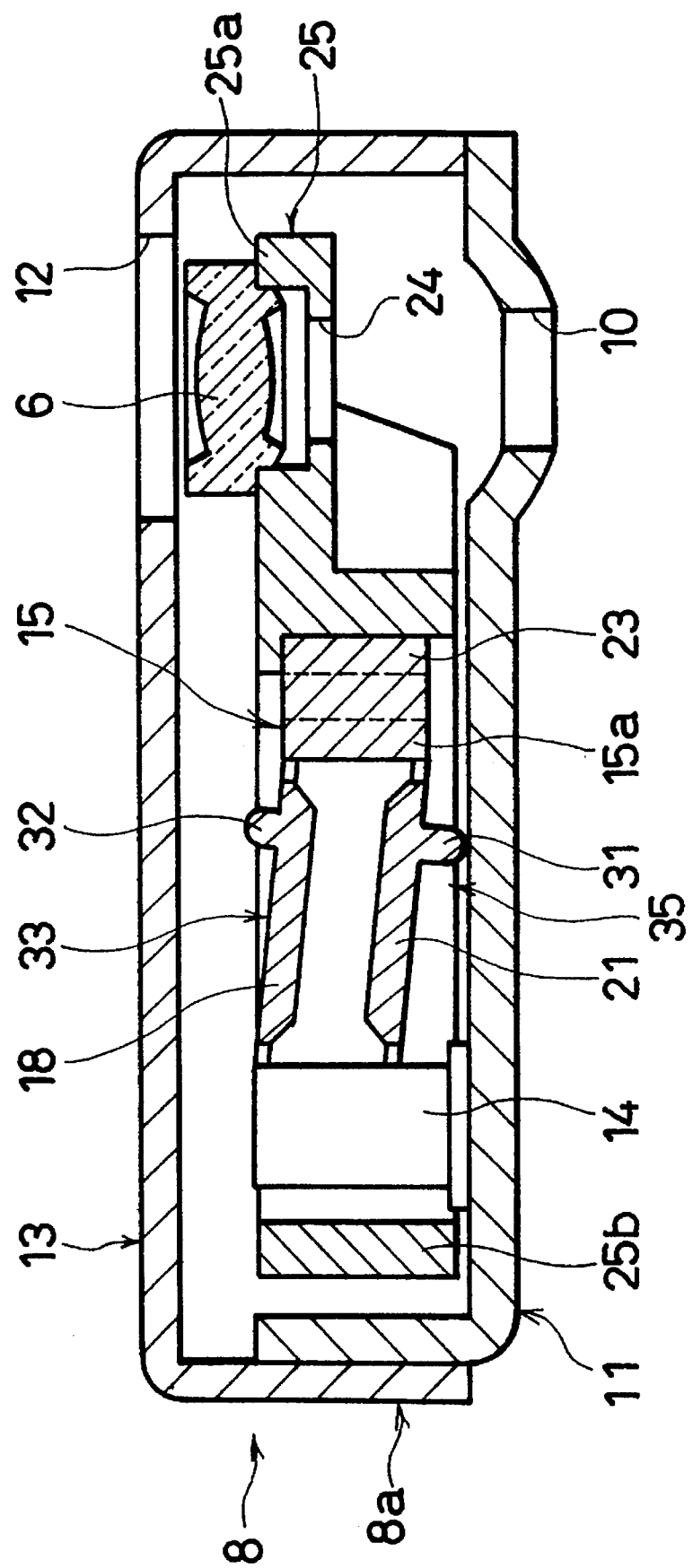
FIG. 3 is a cross-sectional view taken along the line I—I showing the objective lens holding device of FIG. 1 with its lens holder contacting a base plate.

As illustrated in FIG. 3, the height of the stopper 31 is set to such a level that the bottom surface of the lens holder 25 does not touch the inner surface of the base plate 11 when the tip of the stopper 31 comes into contact with the base plate 11. Here, the stopper 31 is integrally formed together with the parallel link mechanism 33.

With this arrangement, under high temperature such as inside a car in summer or in the case of a shelf test under high temperature, even if the hinges 16, 17, 19 and 20, each molded of synthetic resin with a partially thinner portion, become softened and cause the lens holder 25 to be dislocated due to its weight toward the base plate 11 in the housing 8a, the stopper 31 thus installed with such height can make a gap between the lens holder 25 and the base plate 11.

On the other hand, in the case of conventional arrangements, the hinges, each of which has sufficient elasticity that permits the objective lens to shift in the focusing direction, often become softened due to high temperature that causes the lens holder to be dislocated toward the base plate in the housing because of its weight and contact with the inner wall of the base plate.

In most of these cases, since the housing is manufactured without taking into account of the positional relationship between the housing and the objective lens (and thus the bottom surface of the lens holder is not parallel to the inner wall of the base plate), the lens holder, having thus undergone the contact, is often brought into a distorted or twisted state compared with the state under normal temperature.

Therefore, in conventional arrangements, when the ambient temperature drops to normal temperature or low temperature and the hinges recover their original modulus of elasticity to allow the lens holder to move to its original station, the lens holder tends to return to a different station (e.g., a different state from the original-state whereto the lens holder has been adjusted). This results in deviation or tilt between the axis of the objective lens attached to the lens holder and the light axis, thereby causing deterioration in the optical performance of the objective lens. This deterioration in the optical performance appears even with a tilt on the order of 20–30' between the axis of the objective lens and the light axis.

By the use of the arrangement of the present embodiment, even if the hinges 16, 17, 19 and 20 become softened and fail to maintain the rocking system 35 at the predetermined station, the stopper 31 can prevent the lens holder 25 from contacting the base plate 11 since the tip of the stopper 31 comes into contact with the inner wall of the base plate 11. Further, the lens holder 25 can be shifted while maintaining a virtually parallel state to the original state.

Therefore, the arrangement of the present embodiment makes it possible to avoid the restoration of the lens holder 25 with a distorted state, which has been the conventional disadvantage, even after the ambient temperature drops to normal temperature or low temperature and the hinges 16, 17, 19 and 20 recover their original hardness to allow the lens holder 25 to return to its original station. The present embodiment thus prevents deviation or tilt of the axis of the objective lens 6 with respect to the light axis.

As a result, this simple structure provided with the stopper 31 integrally molded therein makes it possible to avoid deviation or tilt of the lens holder 25 (i.e., deviation or tilt of the objective lens 6, due to temperature changes; changes). Thus, the performance of the predeterminately adjusted objective lens 6 can be maintained and the deterioration of optical performance due to temperature changes can be prevented. Further, by the use of this structure provided with the stopper 31 integrally molded therein, manufacturing cost can be reduced by eliminating the fixing process of the stopper 31.

However, in the arrangement of the present embodiment, while maintaining advantages of the high working efficiency and high precision in assembly that are obtained by the use of the mold-type support member (including the support member 14, the parallel link mechanism 33 and rocking member 15, all integrally molded therein, numerous advantages are achieved. For example deterioration in optical performance of the objective lens 6, which has been a conventional disadvantage, can be prevented. The requirements of high precision machining of the inner walls of the housing can be alleviated. Time-consuming work and processes for adjusting the installation of the objective lens 6 under high temperature or for adjusting it again later on can be eliminated. All of these advantages result in a lower manufacturing cost.

Further, another arrangement may be proposed, wherein the stopper 31 is disposed at a position within the above-mentioned hypothetical plane including the pivotal axis of the hinge 22 and the axis of the objective lens 6. With this arrangement, when the stopper 31 comes into contact with the inner wall of the base plate 11 to support the rocking system 35, its weight distribution can be well-balanced. Therefore, the lens holder 25, having been subjected to the dislocation under high temperature, can be supported with a higher state of parallelism with respect to the original state.

Thus, the above arrangement makes it possible to support the lens holder 25 more stably without making it contact with the base plate 11 even under high temperature and to ensure the lens holder 25 will return to its original state more stably, thereby preventing the deterioration of optical performance caused by temperature changes more effectively.

Further, the stopper 31 may be disposed on the rocking vertical plate 15a at its side face opposite to the base plate 11 because the rocking vertical plate 15a is disposed in the vicinity of the center of gravity of the pivotal system 34 and the rocking system 35.

On the other hand, in the case of a structure such as a changer for use in CDs (Compact Disk) wherein the optical disk 1 is rotatively driven in the horizontal direction and the optical pickup 3 is located above the recording surface 1a of the optical disk 1 in a reversed manner from the normal position, a stopper 32 that is identical to the stopper 31 may be installed at a position on the link member 18 that is opposite to the cover 13 and closer to the rocking member 15 instead of the former position of the stopper 31.

Figure 4:
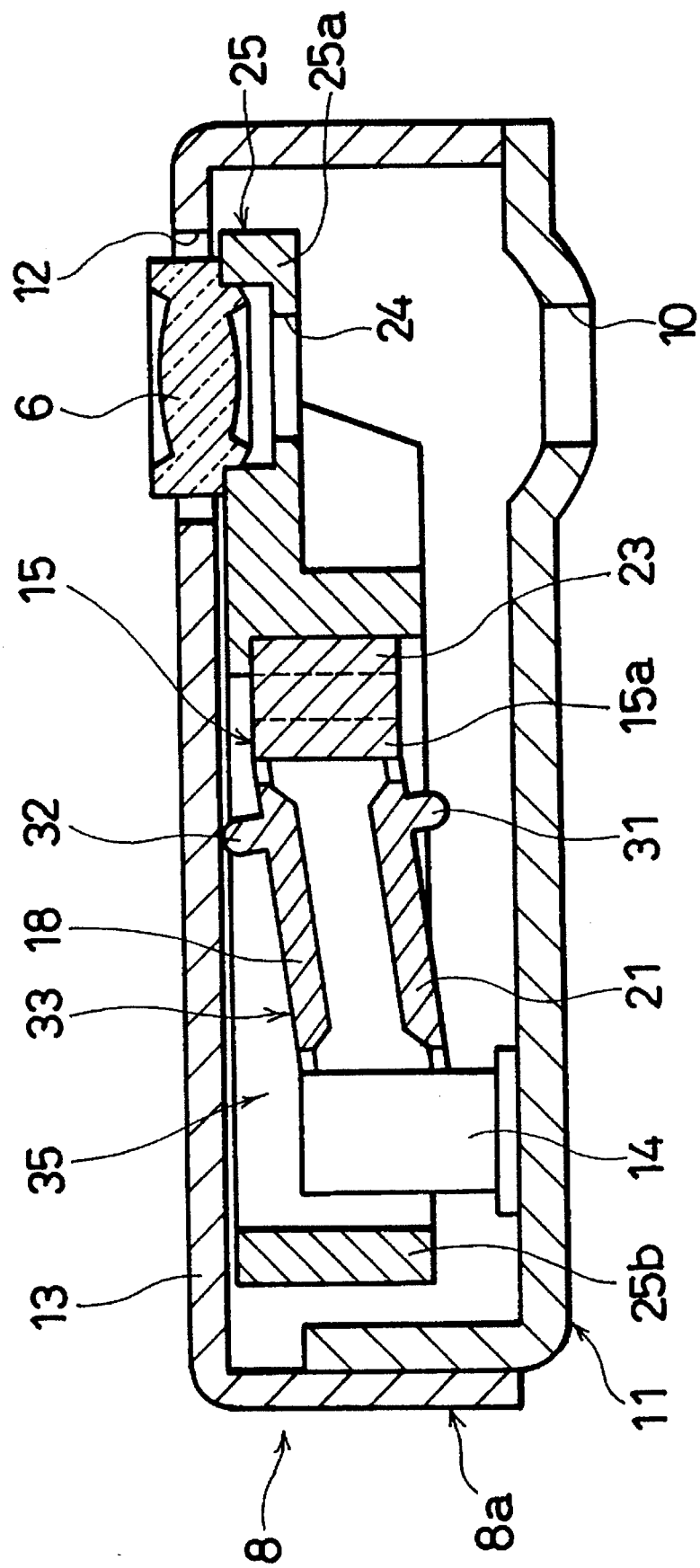
FIG. 4 is a cross-sectional view taken along the line I—I showing the objective lens holding device of FIG. 1 with its lens holder contacting a cover.

As illustrated in FIG. 4, the height of the stopper 32 is set to such a level that the upper surface of the lens holder 25 does not touch the inner surface of the cover 13 when the tip of the stopper 32 comes into contact with the inner surface of the cover 13. Here, the stopper 32 is integrally formed together with the parallel link mechanism 33.

Additionally, in the arrangements of the above-mentioned embodiments, the stopper 31 or the stopper 32 is, for example, formed on the link member 21 or the link member 19. However, the position of the stopper 31 or 32 is not necessarily limited as long as it is formed so as to prevent the lens holder 25 from contacting the cover 13 or the base plate 11 when the lens holder 25 is extremely dislocated. For example, the stopper 31 or 32 may be formed on the base plate 11 or on the inner wall of the cover 13 with the integrally molded structure.

Figure 6:
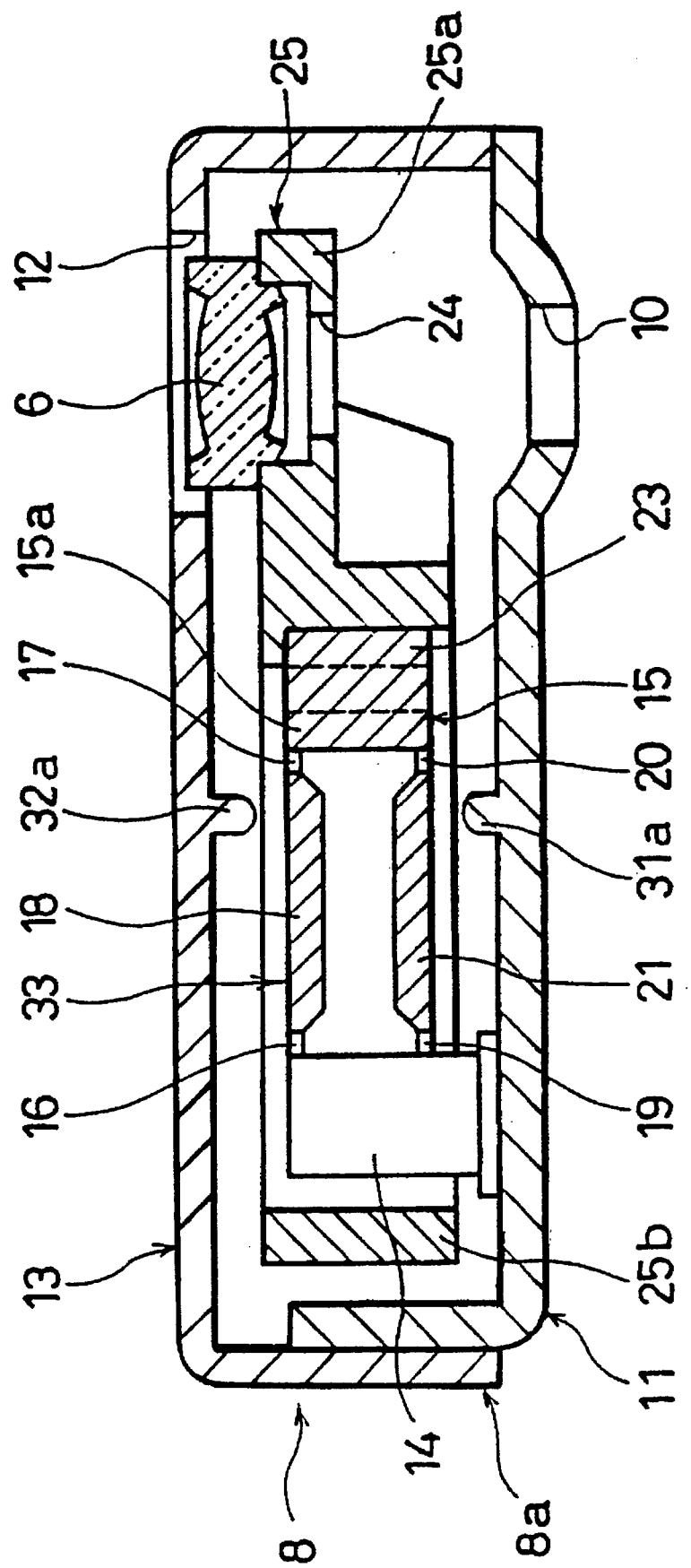
FIG. 6 is a cross-sectional view of an objective lens holding device having contact prevention means extending from a housing.
Figure 7:
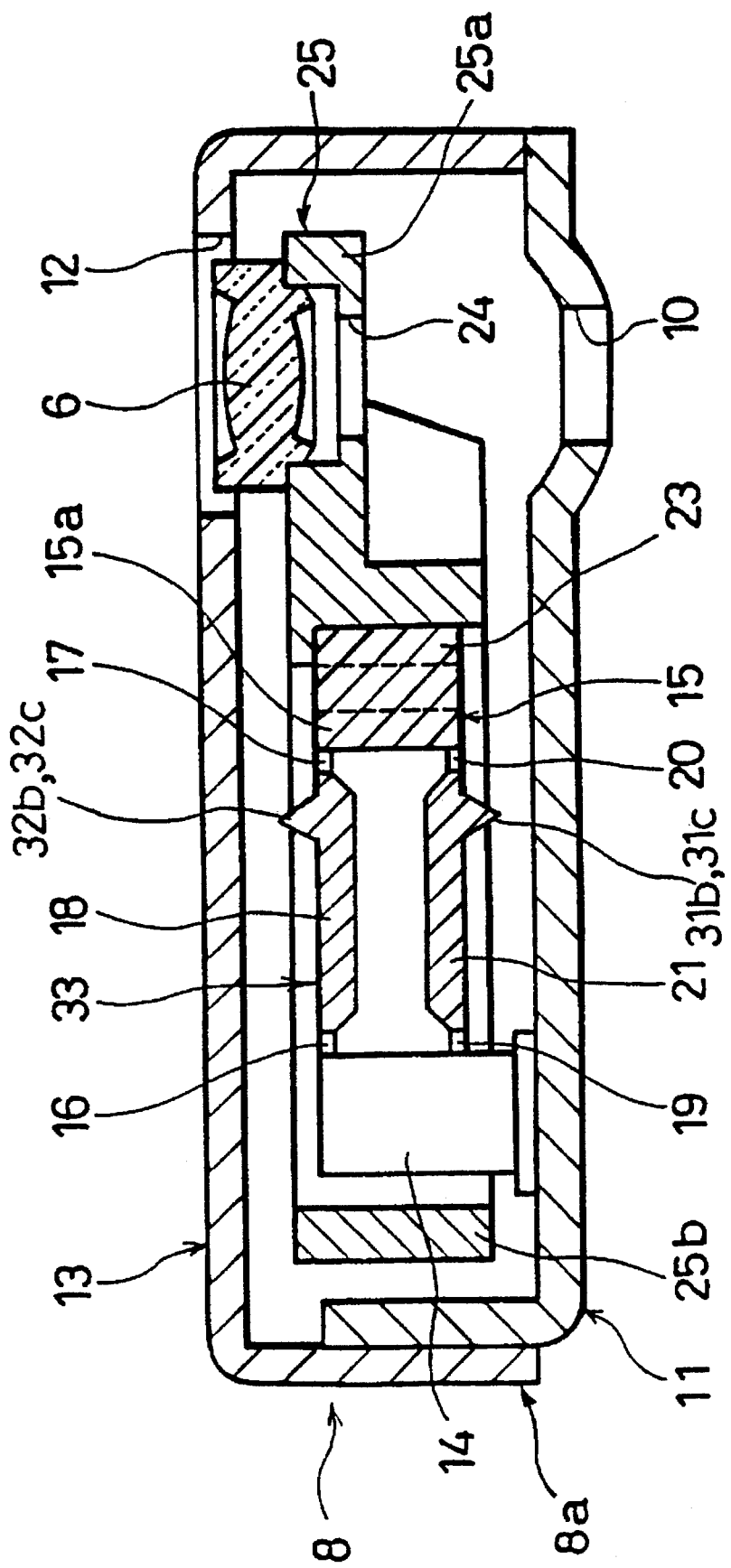
FIG. 7 is a cross-sectional view of an objective lens holding device having contact prevention means of a tapering cross-sectional shape.
Figure 10:
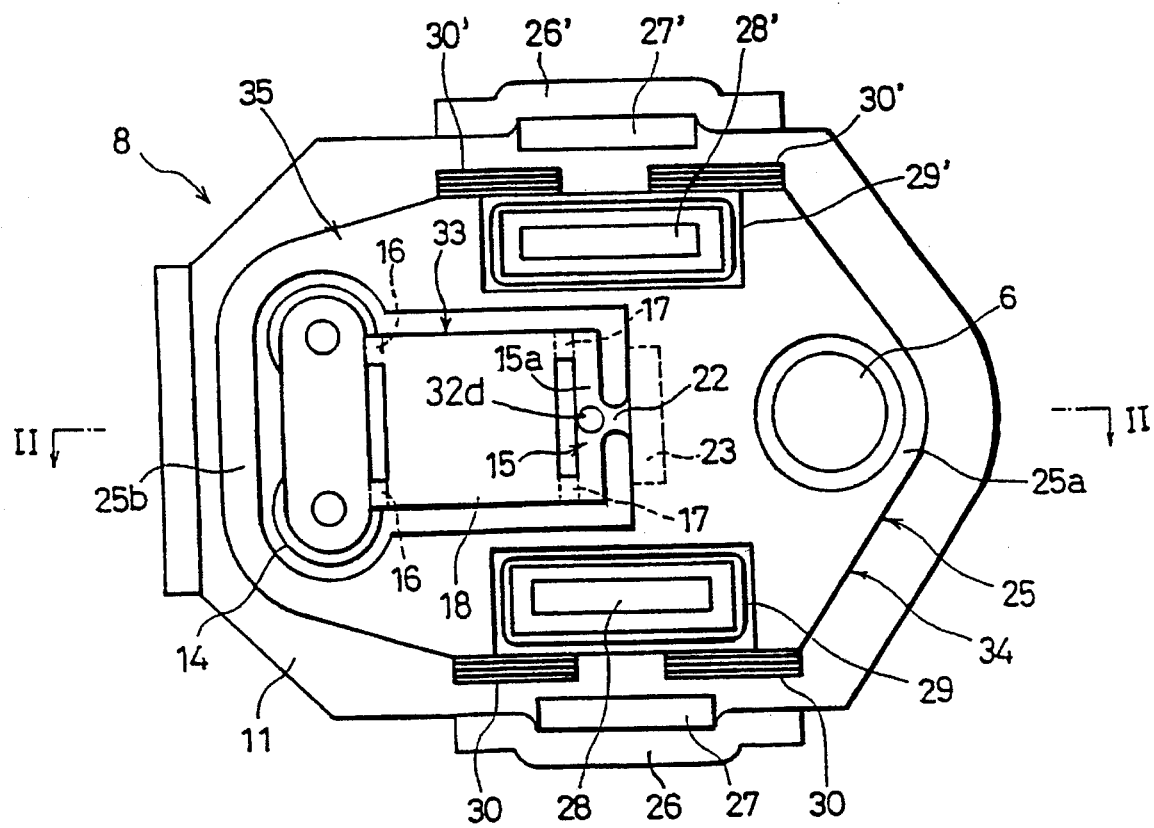
FIG. 10 is a plan view showing an objective lens holding device having a contact prevention means installed on a rocking member.
Figure 11:
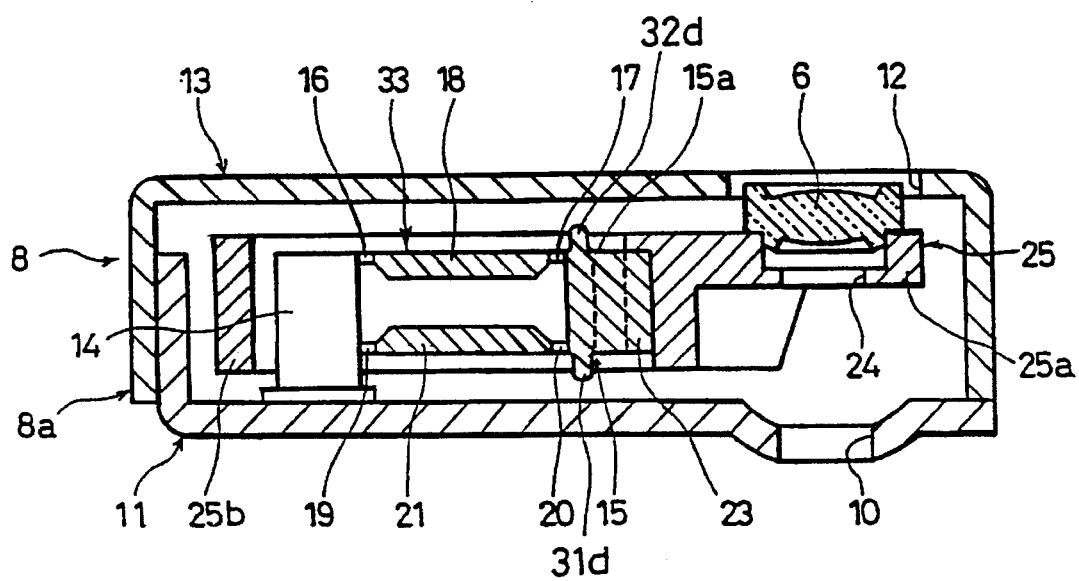
FIG. 11 is a cross-sectional view taken along the line II—II showing the objective lens holding device of FIG. 10.
Figure 12:
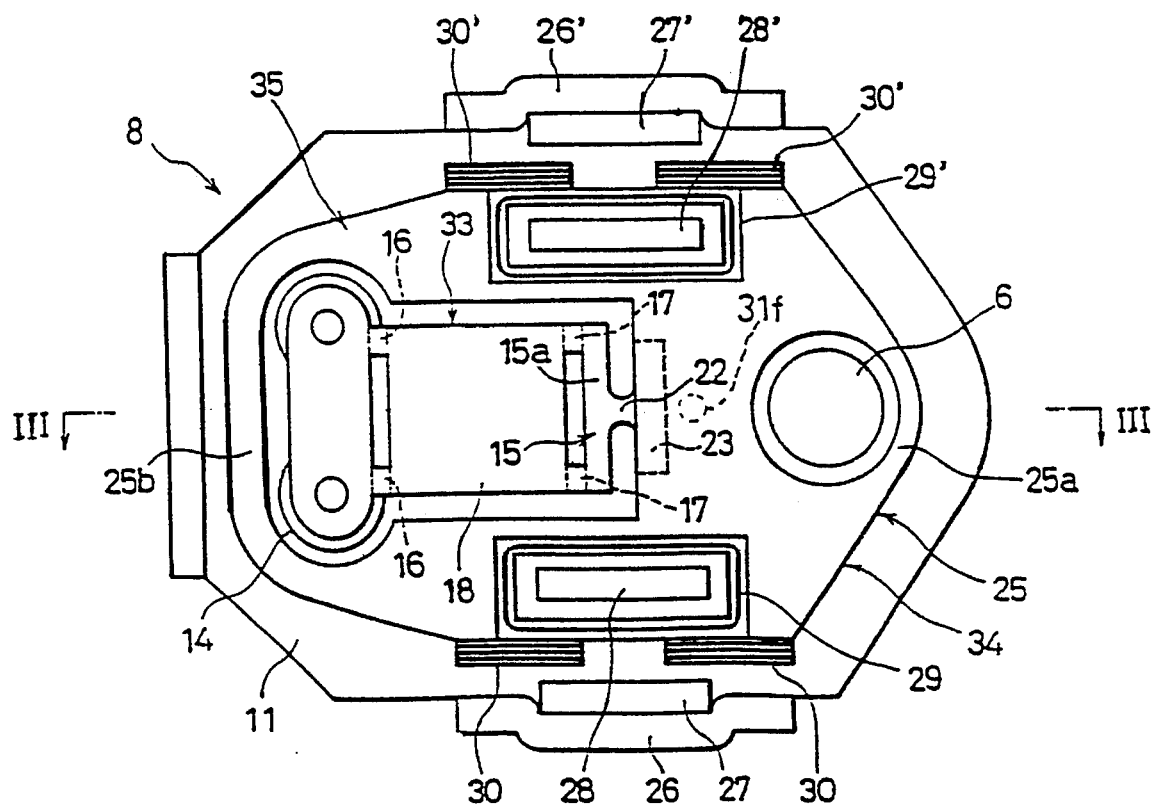
FIG. 12 is a plan view showing an objective lens holding device having a contact prevention means which comes into point contact with lens holding means.
Figure 13:
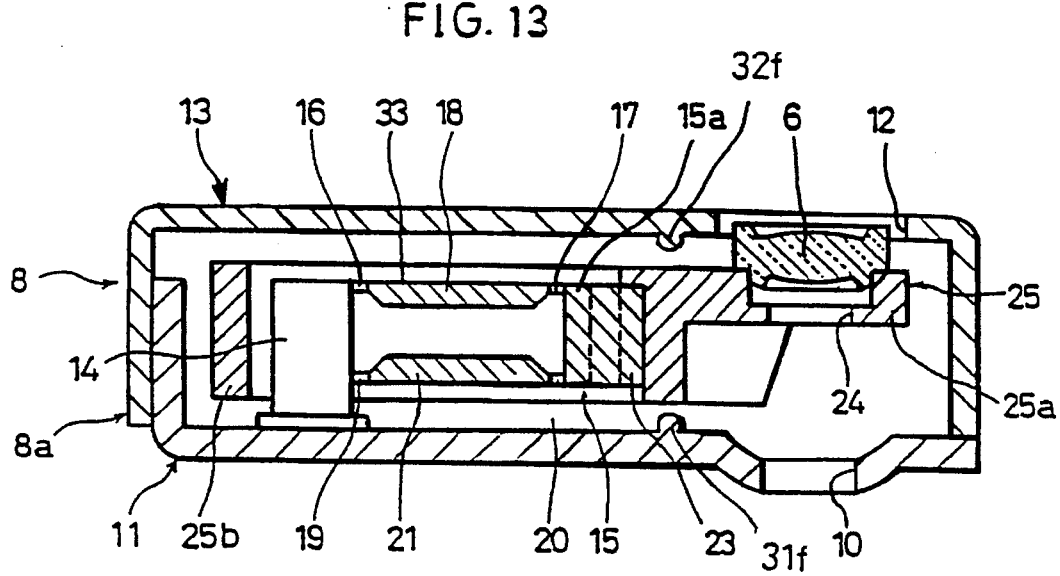
FIG. 13 is a cross-sectional view taken along the line III—III showing the objective lens holding device of FIG. 12.

In this regard, stoppers can contact link members 18, 21 (see stoppers 31a, 32a in FIGS. 6 and 7) or the lens holding means 25 (see stoppers 31f, 32f in FIGS. 12 and 13). Further, stoppers 31d, 32d can be mounted on rocking member 15 (see FIG. 10).

Figure 8:
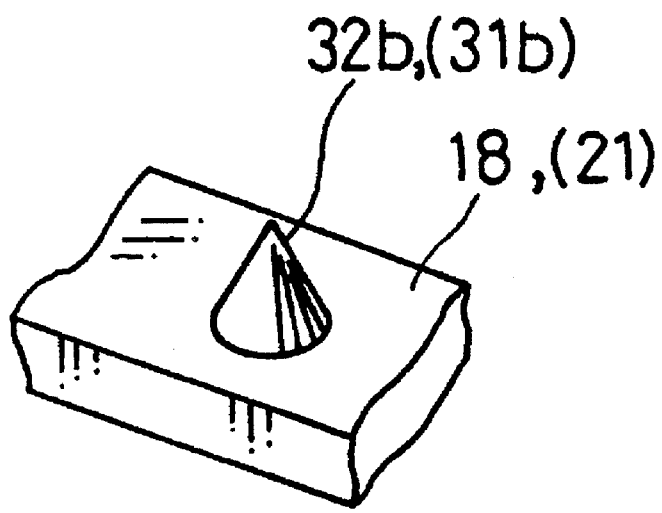
FIG. 8 is an isometric view of a conically-shaped contact prevention means.
Figure 9:
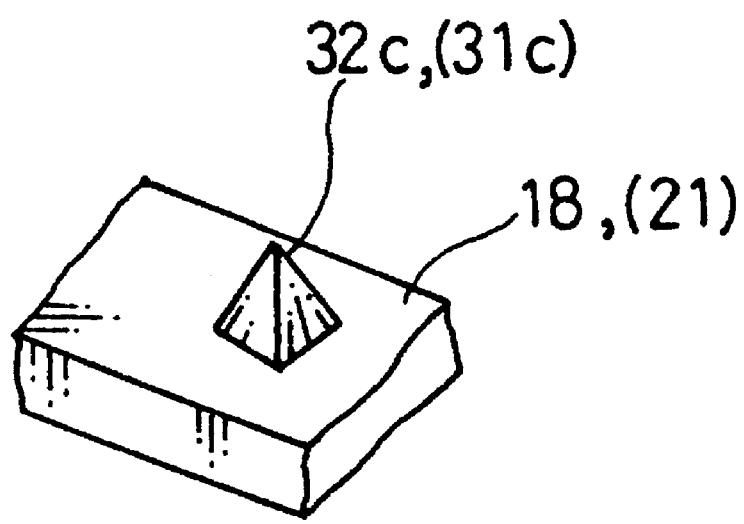
FIG. 9 is an isometric view of a pyramid-shaped contact prevention means.
Figure 14:
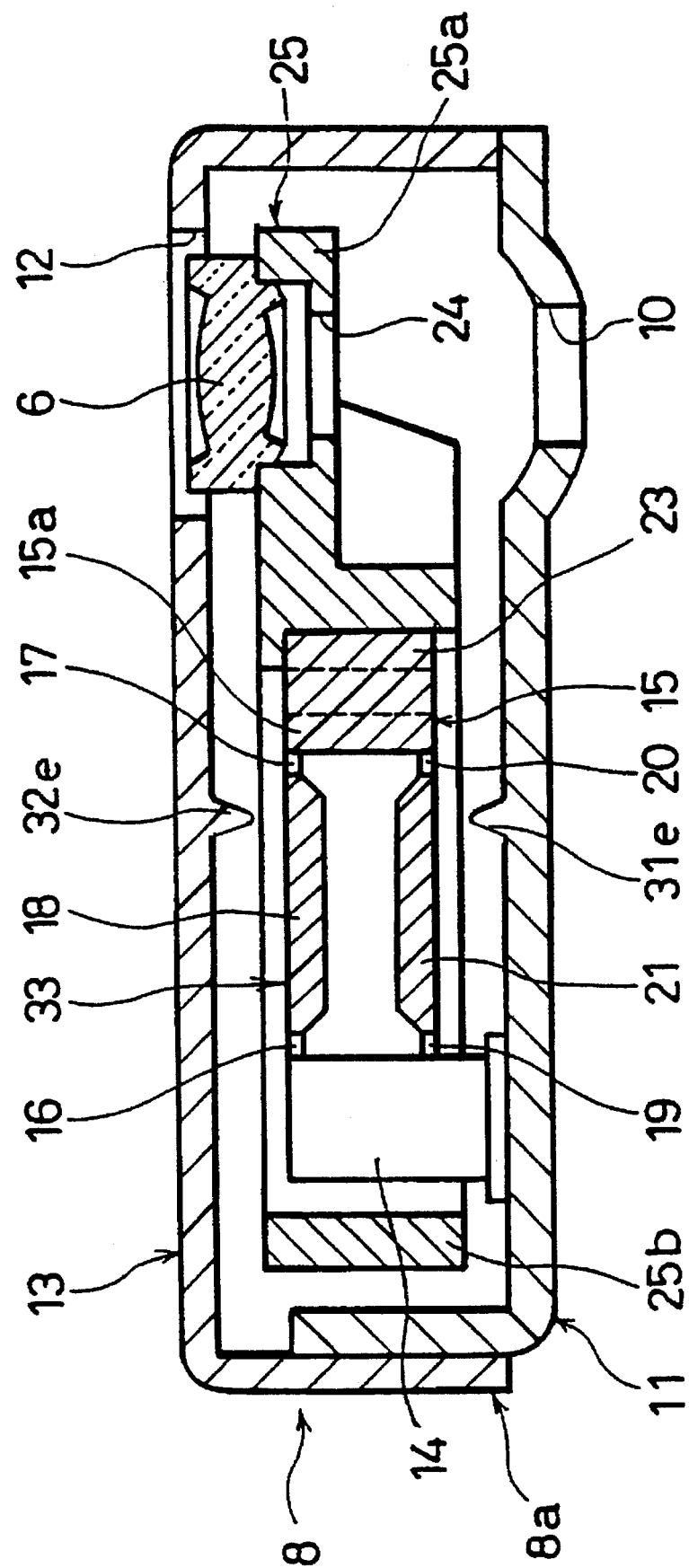
FIG. 14 is a cross-sectional view of an objective lens holding device having contact prevention means extending with narrowing shape from a housing.

Moreover, the tip of the stopper 31 or 32 may be formed into, for example, a shape narrowing toward the top such as a taper shape (see stoppers 31b, 31c and 32b, 32c in FIG. 7 or stoppers 31e, 32e in FIG. 14), a dome shape, a cone shape (see stoppers 31b, 31c and 32b, 32c in FIGS. 7 and 8) or a pyramid shape (see stopper 31c, 32c in FIG. 9) so that its contact area may become minimized, that is, a point contact may be achieved when the stopper 31 or 32 comes into contact with the inner wall of the base plate 11 or the cover 13.

With this structure, even in the case when the inner wall of the base plate 11 or the cover 13 is slanted against a hypothetical plane perpendicular to the light axis of the objective lens 6 or when the inner wall contains protrusions and recessions that show an imperfect plane precision, the stopper 31 or 32 can support the dislocated lens holder 25 with a higher state of parallelism with respect to the original state by avoiding the adverse effects due to the slant or the imperfect plane precision.

Thus, this arrangement makes it possible to ensure the lens holder 25 will return to its original state more stably, thereby preventing the deterioration of optical performance caused by temperature changes more, effectively. The same advantages can be obtained in the case of fixing the stopper 31 or 32 on the inner wall of the base plate 11 or the cover 13.

Thus, this arrangement has adaptability for alternation of the mounting station of the optical pickup 3, and also is applied to various mounting stations or relocations of optical information pickup apparatuses such as CDs that are provided with the above-mentioned objective lens holding device.

Additionally, in the optical pickup 3, the moving mechanism 9 may be geared to the pivotal system 34 so as to be well adapted for track searching or other function. Further, both of the stoppers 31 and 32 may be fixed at the respective positions on the parallel link mechanism 33.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An objective lens holding device comprising:

a housing;

objective lens means for converging light onto a predetermined position;

lens holding means for holding the objective lens means;

link means for coupling the lens holding means to the housing, the link means being provided with a first hinge section which is elastically distorted such that the lens holding means shifts the objective lens means in a focusing direction, the link means being made of a thermoplastic resin and being provided with a pair of plate-like members that face an inner wall of the housing and couple the first hinge section to the housing;

contact prevention means, formed in a protruding fashion, for preventing the lens holding means from contact with an inner wall of the housing, the contact being caused by an excessive dislocation of the first hinge section due to temperature changes, the dislocation otherwise causing the first hinge section to deform into an unrecoverable shape; and wherein the contact prevention means comes into a point contact with the housing so as to support the dislocated lens holding means, the contact prevention means having a shape narrowing toward a top of the contact prevention means.

2. The objective lens holding device as set forth in claim 1, wherein the link means comprises a pair of plate-like members that are disposed in parallel to each other with a predetermined space in the focusing direction and the contact prevention means is installed on at least one of the plate-like members in an extending fashion toward the inner wall of the housing that is opposite to the plate-like member.

3. The objective lens holding device as set forth in claim 1, wherein the link means comprises a pair of plate-like members that are disposed in parallel to each other with a predetermined space in the focusing direction and the contact prevention means is installed on the inner wall of the housing in an extending fashion toward a relevant plate-like member of the plate-like members that is opposite to the inner wall of the housing.

4. The objective lens holding device as set forth in claim 1, wherein the contact prevention means has a dome shape.

5. The objective lens holding device as set forth in claim 1, wherein the contact prevention means has a cone shape.

6. The objective lens holding device as set forth in claim 1, wherein the contact prevention means has a pyramid shape.

7. An objective lens holding device comprising:

a housing;

objective lens means for converging light onto a predetermined position;

lens holding means for holding the objective lens means;

link means for coupling the lens holding means to the housing, the link means being provided with a first hinge section which is elastically distorted such that the lens holding means shifts the objective lens means in a focusing direction, the link means being made of a thermoplastic resin and being provided with a pair of plate-like members that face an inner wall of the housing and couple the first hinge section to the housing;

contact prevention means, formed in a protruding fashion, for preventing the lens holding means from contact with an inner wall of the housing, the contact being caused by an excessive dislocation of the first hinge section due to temperature changes, the dislocation otherwise causing the first hinge section to deform into an unrecoverable shape;

a pivotal system which is rotatively pivoted such that the objective lens means is driven in a tracking direction;

wherein the contact prevention means is installed in the vicinity of a center of gravity of the pivotal system.

8. An objective lens holding device comprising:

a housing;

objective lens means for converging light onto a predetermined position;

lens holding means for holding the objective lens means;

link means for coupling the lens holding means to the housing, the link means being provided with a first hinge section which is elastically distorted such that the lens holding means shifts the objective lens means in a focusing direction, the link means being made of a thermoplastic resin and being provided with a pair of plate-like members that face an inner wall of the housing and couple the first hinge section to the housing;

contact prevention means, formed in a protruding fashion for preventing the lens holding means from contact with an inner wall of the housing, the contact being caused by an excessive dislocation of the first hinge section due to temperature changes, the dislocation otherwise causing the first hinge section to deform into an unrecoverable shape;

a pivotal system which is rotatively pivoted such that the objective lens means is driven in a tracking direction;

wherein the pivotal system comprises a second hinge section including a pivotal axis parallel to a light axis of the objective lens means, the second hinge section pivotally connecting a pivoting end of the link means to the lens holding means.

9. The objective lens holding device as set forth in claim 8, wherein the contact prevention means is disposed at a position within a hypothetical plane including the pivotal axis and the light axis.

10. The objective lens holding device as set forth in claim 8, further comprising:

a first magnetic field generator means for generating a first magnetic field so as to drive the objective lens means in the focusing direction and in the tracking direction, the first magnetic field generator means being symmetrically disposed in the housing centered on the pivotal axis; and a second magnetic field generator means for generating a controlling magnetic field for use in tracking control for the objective lens means, wherein the lens holding means is pivotally driven in the tracking direction centered on the second hinge section through an interaction between the first magnetic fields and the controlling magnetic field.

11. The objective lens holding device as set forth in claim 10, wherein the second magnetic field generator means is a tracking coil.

12. The objective lens holding device as set forth in claim 8, further comprising:

a first magnetic field generator means for generating a first magnetic field so as to drive the objective lens means in the focusing direction and in the tracking direction, the first magnetic field generator means being symmetrically disposed in the housing centered on the pivotal axis; and a second magnetic field generator means for generating a controlling magnetic field for use in focusing control for the objective lens means, wherein the lens holding means is driven in the focusing direction while maintaining a positional relationship of the lens holding means with respect to the light axis through an interaction between the first magnetic field, and the controlling magnetic field.

13. An objective lens holding device as set forth in claim 12, wherein the second magnetic field generator means is a bobbin-shaped focusing coil.

14. An objective lens holding device comprising:

a housing;

objective lens means for converging light onto a predetermined position;

lens holding means for holding the objective lens means;

link means for coupling the lens holding means to the housing, the link means being provided with a first hinge section which is elastically distorted such that the lens holding means shifts the objective lens means in a focusing direction, the link means being made of a thermoplastic resin and being provided with a pair of plate-like members that face an inner wall of the housing and couple the first hinge section to the housing;

contact prevention means, formed in a protruding fashion, for preventing the lens holding means from contact with an inner wall of the housing, the contact being caused by an excessive dislocation of the first hinge section due to temperature changes, the dislocation otherwise causing the first hinge section to deform into an recoverable shape;

wherein the lens holding means, the link means and the first hinge section are integrally molded.

15. The objective lens holding device as set forth in claim 14, wherein the first hinge section is formed as a partially thinner portion.

16. The objective lens holding device as set forth in claim 14, wherein the lens holding means, the link means and the first hinge section are integrally molded from a synthetic resin.

17. An objective lens holding device comprising:

a housing;

objective lens means for converging light onto a predetermined position;

lens holding means for holding the objective lens means;

link means for coupling the lens holding means to the housing, the link means being provided with a first hinge section which is elastically distorted such that the lens holding means shifts the objective lens means in a focusing direction, the link means being made of a thermoplastic resin and being provided with a pair of plate-like members that face an inner wall of the housing and couple the first hinge section to the housing;

contact prevention means, formed in a protruding fashion, for preventing the lens holding means from contact with an inner wall of the housing, the contact being caused by an excessive dislocation of the first hinge section due to temperature changes, the dislocation otherwise causing the first hinge section to deform into an unrecoverable shape;

wherein the link means comprises a rocking member for connecting pivotal ends of the link means to the lens holding means, the contact prevention means being installed on the rocking member.

18. An objective lens holding device as set forth in claim 17, wherein the rocking member includes a first surface and a second surface, each facing each opposite inner wall of the housing in the focusing direction, the contact prevention means being installed on at least one of the first surface and the second surface in an protruding fashion.

19. An objective lens holding device comprising:

a housing;

objective lens means for converging light onto a predetermined position;

lens holding means for holding the objective lens means;

link means for coupling the lens holding means to the housing, the link means being provided with a first hinge section which is elastically distorted such that the lens holding means shifts the objective lens means in a focusing direction, the link means being made of a thermoplastic resin and being provided with a pair of plate-like members that face an inner wall of the housing and couple the first hinge section to the housing;

contact prevention means, formed in a protruding fashion, for preventing the lens holding means from contact with an inner wall of the housing, the contact being caused by an excessive dislocation of the first hinge section due to temperature changes, the dislocation otherwise causing the first hinge section to deform into an unrecoverable shape;

wherein the contact prevention means comes into a point contact with the link means so as to support the dislocated lens holding means, the contact prevention means having a shape narrowing toward a top of the contact prevention means.

20. An objective lens holding device comprising:

a housing;

an objective lens for converging light onto a predetermined position;

a focusable lens mounting assembly comprising:

a support member connected at one end of the housing;

a lens holder for holding the objective lens;

a linkage which has a first end connected to the support member and a second end for suspending the lens holder in cantilevered fashion within the housing, whereby the objective lens is moveable in a focusing direction, at least one of the linkage first and second ends comprising a hinge, the linkage being made of a thermoplastic resin; and a contact prevention stopper member which only partially extends between the lens mounting assembly and housing when the hinge of the linkage is not temperature deformed, the contact prevention stopper member being sized to limit travel of the lens holder in the focusing direction when the hinge of the linkage is deformed by temperature so that such deformation would not cause the hinge to deform into an unrecoverable shape, the contact prevention stopper member being attached to the lens holder.

21. The objective lens holding device as set forth in claim 20, wherein the contact prevention stopper member has a tapered cross-sectional shape.

22. The objective lens holding device as set forth in claim 20, wherein the contact prevention stopper member has a domed cross-sectional shape.

23. The objective lens holding device as set forth in claim 20, wherein the first and second ends of the linkage are comprised of hinges.

* * * * *